US011936121B2

(12) United States Patent
Odes

(10) Patent No.: US 11,936,121 B2
(45) Date of Patent: Mar. 19, 2024

(54) EXTREMELY LOW PROFILE ULTRA WIDE BAND ANTENNA

(71) Applicant: GM GLOBAL TECHNOLOGY OPERATIONS LLC, Detroit, MI (US)

(72) Inventor: Uriel Zvi Odes, Givaat Shmuel (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/131,731

(22) Filed: Apr. 6, 2023

(65) Prior Publication Data

US 2023/0261379 A1 Aug. 17, 2023

Related U.S. Application Data

(62) Division of application No. 17/409,586, filed on Aug. 23, 2021, now Pat. No. 11,652,290.

(51) Int. Cl.

| | |
|---|---|
| ***H01Q 5/25*** | (2015.01) |
| ***H01Q 1/36*** | (2006.01) |
| ***H01Q 1/48*** | (2006.01) |
| ***H01Q 9/04*** | (2006.01) |

(52) U.S. Cl.

CPC ................. *H01Q 5/25* (2015.01); *H01Q 1/36* (2013.01); *H01Q 1/48* (2013.01); *H01Q 9/0421* (2013.01)

(58) Field of Classification Search

None

See application file for complete search history.

(56) References Cited

U.S. PATENT DOCUMENTS

| | | | | |
|---|---|---|---|---|
| 3,015,101 | A | 12/1961 | Turner et al. | |
| 3,170,158 | A | 2/1965 | Rotman | |
| 3,778,839 | A | 12/1973 | Kovar | |
| 3,942,180 | A | 3/1976 | Rannou et al. | |
| 4,143,377 | A * | 3/1979 | Salvat | H01Q 19/06 343/773 |
| 4,225,869 | A * | 9/1980 | Lohrmann | H01Q 21/08 343/773 |
| 4,506,267 | A | 3/1985 | Harmuth | |
| 4,851,859 | A | 7/1989 | Rappaport | |
| 5,307,081 | A | 4/1994 | Harmuth | |
| 5,926,150 | A | 7/1999 | McLean et al. | |
| 6,166,698 | A | 12/2000 | Turnbull et al. | |
| 6,208,306 | B1 | 3/2001 | McLean et al. | |
| 6,288,686 | B1 | 9/2001 | Josypenko | |
| 6,483,463 | B2 | 11/2002 | Kadambi et al. | |
| 6,903,687 | B1 | 6/2005 | Fink et al. | |
| 6,950,068 | B2 | 9/2005 | Bordi et al. | |

(Continued)

FOREIGN PATENT DOCUMENTS

| | | | | |
|---|---|---|---|---|
| CA | 2749845 | A1 * | 2/2012 | H01Q 9/28 |
| JP | 6151251 | B2 | 6/2017 | |

*Primary Examiner* — Ab Salam Alkassim, Jr.
*Assistant Examiner* — Anh N Ho

(57) ABSTRACT

An ultra wide band antenna includes: a first antenna body including: a first planar portion; a first tapered side portion; and a first cylinder; and a second antenna body including: a second planar portion; a second tapered side portion; and a second cylinder, and a connecting portion connecting at least one of the first planar portion and the first tapered side portion on a back side of the first antenna body to at least one of the second planar portion and the second tapered side portion on a back side of the second antenna body.

10 Claims, 5 Drawing Sheets

(56) References Cited

U.S. PATENT DOCUMENTS

| | | | |
|---|---|---|---|
| 7,019,698 | B2 | 3/2006 | Miyoshi et al. |
| 7,889,151 | B1 | 2/2011 | Brock et al. |
| 8,736,506 | B1 | 5/2014 | Brock et al. |
| 9,099,777 | B1 | 8/2015 | Manry, Jr. |
| 10,411,357 | B1 | 9/2019 | Ashraf et al. |
| 11,158,947 | B2 | 10/2021 | Delaveaud et al. |
| 2001/0022559 | A1 | 9/2001 | Takahashi et al. |
| 2003/0038749 | A1 | 2/2003 | Chen |
| 2004/0169609 | A1 | 9/2004 | Song et al. |
| 2005/0007284 | A1 | 1/2005 | Komatsu et al. |
| 2006/0176221 | A1 | 8/2006 | Chen et al. |
| 2006/0227051 | A1 | 10/2006 | Yamamoto et al. |
| 2007/0024511 | A1 | 2/2007 | Li et al. |
| 2007/0229367 | A1 | 10/2007 | Fukui et al. |
| 2007/0273607 | A1 | 11/2007 | Chen |
| 2008/0122700 | A1 | 5/2008 | Mei |
| 2009/0027294 | A1 | 1/2009 | Bourry et al. |
| 2009/0102729 | A1 | 4/2009 | Wang et al. |
| 2010/0026593 | A1 | 2/2010 | Chang et al. |
| 2012/0026047 | A1 | 2/2012 | Ferrero |
| 2012/0081252 | A1 | 4/2012 | Pan |
| 2014/0285382 | A1 | 9/2014 | Dobric |
| 2014/0327590 | A1 * | 11/2014 | Meharry ................ H01Q 13/04 29/601 |
| 2015/0280317 | A1 | 10/2015 | Morin et al. |
| 2017/0025766 | A1 | 1/2017 | Su et al. |
| 2017/0047660 | A1 | 2/2017 | Manry, Jr. |
| 2017/0141480 | A1 | 5/2017 | Ng et al. |
| 2017/0256849 | A1 | 9/2017 | Cohen |
| 2017/0317409 | A1 | 11/2017 | Ayatollahi et al. |
| 2018/0090834 | A1 | 3/2018 | Ng et al. |
| 2018/0219282 | A1 | 8/2018 | Hefele et al. |
| 2018/0323515 | A1 | 11/2018 | Tang et al. |
| 2018/0337461 | A1 | 11/2018 | Kildal et al. |
| 2018/0358697 | A1 | 12/2018 | Zhou et al. |
| 2019/0131699 | A1 | 5/2019 | Shamblin |
| 2019/0334242 | A1 | 10/2019 | Wilson |
| 2020/0006844 | A1 | 1/2020 | Ortigosa |
| 2020/0036075 | A1 | 1/2020 | Ding et al. |
| 2020/0220254 | A1 | 7/2020 | Sayama |
| 2020/0335857 | A1 | 10/2020 | Shoji et al. |
| 2020/0373676 | A1 * | 11/2020 | Bermeo .................. H01Q 9/28 |
| 2021/0083373 | A1 | 3/2021 | Gomez et al. |
| 2022/0149524 | A1 | 5/2022 | Cheng et al. |

* cited by examiner

FIG. 1A
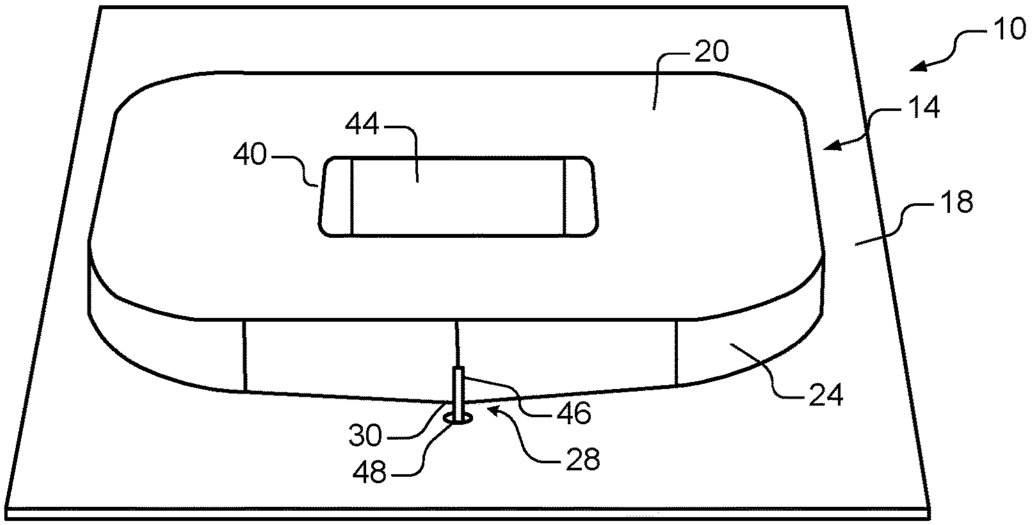
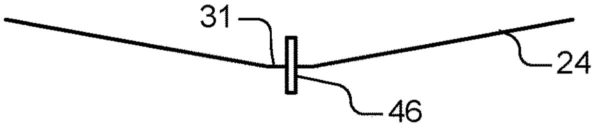
FIG. 1B
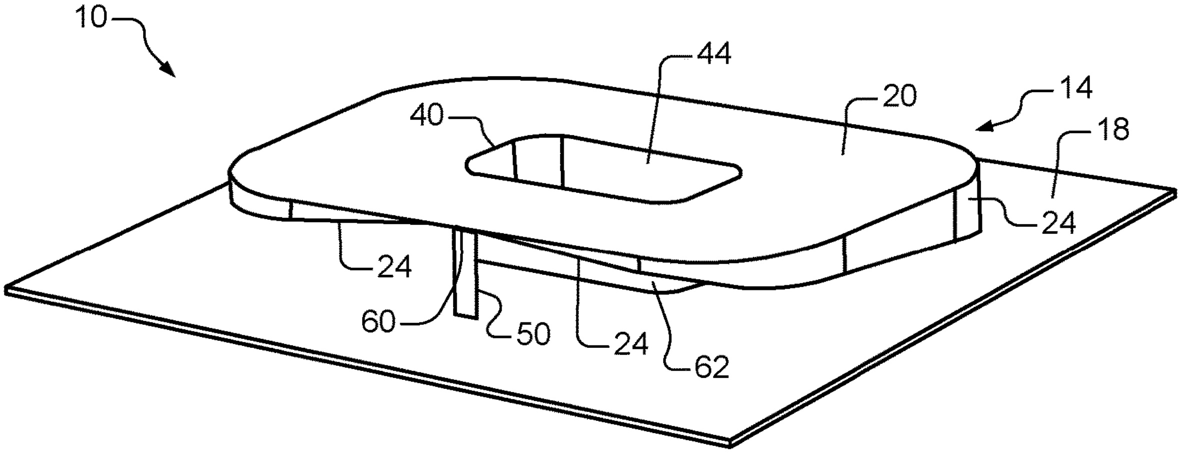
FIG. 2A

EXTREMELY LOW PROFILE ULTRA WIDE BAND ANTENNA

CROSS-REFERENCE TO RELATED APPLICATIONS

The present disclosure is a divisional of U.S. patent application Ser. No. 17/409,586 filed on Aug. 23, 2021. The entire disclosure of the application referenced above is incorporated herein by reference.

This application is related to U.S. patent application Ser. No. 17/409,543 filed on Aug. 23, 2021 and entitled "SIMPLE ULTRA WIDE BAND VERY LOW PROFILE ANTENNA;" U.S. patent application Ser. No. 17/409,627 filed on Aug. 23, 2021 and entitled "SPIRAL TAPERED LOW PROFILE ULTRA WIDE BAND ANTENNA;" and U.S. patent application Ser. No. 17/409,646 filed on Aug. 23, 2021 and entitled "SIMPLE ULTRA WIDE BAND VERY LOW PROFILE ANTENNA ARRANGED ABOVE SLOPED SURFACE." The entire disclosure of the applications referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to antennas and more particularly to ultra wide band antennas.

Vehicles use telematics systems to support wireless telecommunications and information processing. Examples include cellular communications, global positioning system (GPS) navigation, integrated hands-free cell phones, wireless safety communication, vehicle to vehicle (V2V) communication, vehicle to infrastructure (V2I) communication, autonomous driving systems, etc.

The telematics systems transmit and receive data as the vehicle is driven on the road. To facilitate wireless connectivity, the vehicles include one or more antennas that are connected to transmitters and/or receivers of the telematics systems. Examples of antennas that are currently used include mast antennas and shark fin antennas. Various subsystems in the telematics systems transmit and receive on multiple different frequency bands. Ultra wide band (UWB) antennas are a good candidate for cellular applications.

Manufacturers attempt to create cost-effective, fuel-efficient vehicles with attractive styling. Currently-used antenna designs are typically not desirable from a styling viewpoint. For example, the shark fin antenna may be arranged on the roof of the vehicle above a middle of the rear windshield or on the rear deck lid. As can be appreciated, placing the shark fin antenna in those locations detracts from the external design of the vehicle. These types of antennas typically have a height that is approximately 4 of a wavelength at a lowest desired operating frequency.

SUMMARY

An ultra wide band antenna includes a ground plane and an antenna body. The antenna body includes a planar portion arranged above and parallel to the ground plane. A tapered side portion extends perpendicular to the planar portion in a direction towards the ground plane, wraps at least 50% around an outer edge of the planar portion and tapers in height from a feed side of the antenna body in a direction towards a back side of the antenna body. A cylinder is connected to a bottom surface of the planar portion and to the ground plane. A connecting portion connects the back side at the outer edge of the planar portion to the ground plane.

In other features, the planar portion includes an opening and the cylinder is connected to an edge of the opening. A height of the antenna body relative to the ground plane is equal to approximately 1/20 of a wavelength corresponding to a lowest desired operating frequency of the ultra wide band antenna. The feed side of the tapered side portion has a first height and is spaced from the ground plane by a predetermined gap. The back side of the tapered side portion has a second height that is less than the first height.

In other features, a height of the tapered side portion monotonically decreases from the first height to the second height. The tapered side portion wraps around greater than 90% of an edge of the planar portion. The planar portion has a planar cross-section selected from a group consisting of a rounded rectangular shape, a circular shape and an elliptical shape. An antenna feed is connected to a lower edge of the tapered side portion on the feed side.

In other features, a width and a length of planar portion is equal to 0.5 to 5 times a height of the antenna body. The connecting portion extends vertically from the bottom surface of the planar portion to the ground plane and horizontally on the bottom surface of the planar portion from the outer edge of the planar portion at least partially to an outer surface of the cylinder. A center of the back side of the tapered side portion extends downwardly and is connected to the ground plane.

An ultra wide band antenna includes a first antenna body including a first planar portion and a first tapered side portion extending perpendicular to the first planar portion, wrapping around at least 50% of an outer edge of the first planar portion and tapering in height from a feed side of the first antenna body in a direction towards a back side of the first antenna body. A first cylinder is connected to a bottom surface of the first planar portion. A second antenna body includes a second planar portion and a second tapered side portion extending perpendicular to the second planar portion, wrapping around at least 50% of an outer edge of the second planar portion and tapering in height from a feed side of the second antenna body in a direction towards a back side of the second antenna body. A second cylinder is connected to a bottom surface of the second planar portion. The second antenna body is arranged in a mirrored position adjacent to the first antenna body and wherein edges of the first cylinder and the second cylinder are connected together. A connecting portion connects at least one of the first planar portion and the first tapered side portion on the back side of the first antenna body to at least one of the second planar portion and the second tapered side portion on the back side of the second antenna body.

In other features, the first planar portion includes an opening and the first cylinder is connected along an edge of the opening. A height of the first antenna body is equal to approximately 1/20 of a wavelength corresponding to a lowest desired operating frequency.

In other features, the feed side of the first tapered side portion has a first height and the feed side of the second tapered side portion has the first height. The feed side of the first tapered side portion is spaced from the feed side of the second tapered side portion by a predetermined gap. The back side of the first tapered side portion has a second height that is less than the first height of the first tapered side portion. The back side of the second tapered side portion has a second height that is less than the first height of the second tapered side portion.

In other features, the first planar portion and the second planar portion have a cross-section selected from a group consisting of a rounded rectangular shape, a circular shape and an elliptical shape. An antenna feed is connected to an edge of the first tapered side portion on the feed side of the first antenna body and to an edge of the second tapered side portion on the feed side of the second antenna body. A width and a length of first planar portion is equal to 0.5 to 5 times a height of the first antenna body.

In other features, the connecting portion extends vertically from the bottom surface of the first planar portion to the bottom surface of the second planar portion and horizontally from the outer edges of the first planar portion and the second planar portion at least partially to outer surfaces of the first cylinder and the second cylinder. A portion of the first tapered side portion at a center of at the back side extends downwardly and is connected to a portion of the second tapered side portion at a center of at the back side. The first tapered side portion wraps around greater than 90% of the first planar portion.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1A is a perspective view of a feed side of an example of an ultra wide band (UWB) antenna arranged above a ground plane according to the present disclosure;

FIG. 1B is a side view illustrating another example of the tapered side portion near the feed point according to the present disclosure;

FIGS. 2A to 2C are perspective views of examples of a back side of the UWB antenna of FIG. 1A;

In the drawings, reference numbers may be reused to identify similar and/or identical elements.

DETAILED DESCRIPTION

Figure 2B:
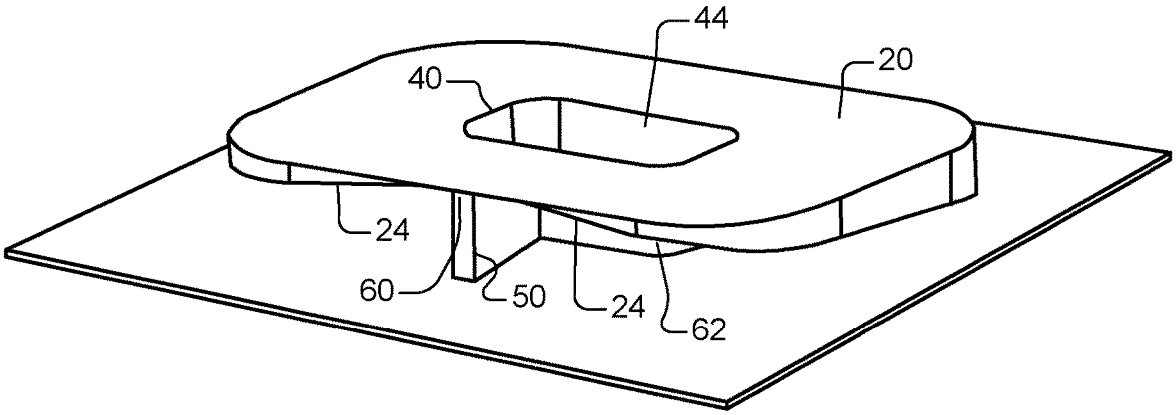

An ultra wide band (UWB) antenna according to the present disclosure has an extremely low profile, which allows the UWB antenna to be incorporated into a variety of different vehicle locations. The extremely low profile allows the UWB antenna to be placed in less noticeable internal or external vehicle locations. For example, the UWB antenna can be concealed in a cavity in the roof below a non-conducting roof material and above a conducting plane (which may be the same as or different than the ground plane of the antenna), which improves the exterior design of the vehicle.

Referring now to FIGS. 1A to 2C, an UWB antenna 10 is shown. In FIG. 1A, the UWB antenna 10 includes an antenna body 14 that is arranged above a ground plane 18. The antenna body 14 includes a planar portion 20 and a tapered side portion 24 that extends from a bottom surface of the planar portion 20 towards the ground plane 18. In some examples, the planar portion 20 has a rounded rectangular shape, an elliptical shape or a circular shape.

In some examples, an opening 40 is formed in the planar portion 20 and has a shape that is similar to a shape of the outer edge of the planar portion 20, although other shapes can be used. For example, the opening 40 may have a rounded rectangular shape, an elliptical shape or a circular shape.

In some examples, the opening 40 is centered relative to the planar portion 20. If the opening 40 is used, an upper edge of a cylinder 44 is connected to a bottom surface of the planar portion 20 at the opening 40 and a lower edge of the cylinder 44 is connected to the ground plane 18. In other examples, the opening 40 can be omitted. If the opening 40 is omitted, a top portion of the cylinder 44 can be attached to a bottom surface of the planar portion 20.

In some examples, the cylinder 44 is a rounded rectangular cylinder, an elliptical cylinder or a circular cylinder. In some examples, the cross-sectional shape and size of the cylinder 44 matches a shape of the opening 40. The cylinder 44 is connected to the bottom surface of the planar portion 20 along an edge of the opening 40 or slightly radially outside of the opening 40 to provide electrical continuity between the planar portion 20 and the cylinder 40.

In some examples, the tapered side portion 24 is connected at or near the outer edge of the planar portion 20 and wraps fully around the edge of the planar portion 20. In other examples, the tapered side portion 24 is connected at or near the outer edge of the planar portion 20 and wraps around greater than or equal to 90% of the edge of the planar portion 20. In still other examples, the tapered side portion wraps around at least 50% of the outer edge of the planar portion (or at least 25% at or near the outer edge of the planar portion in both directions when starting from the antenna feed on the feed side).

The tapered side portion 24 has a height that varies around the outer edge of the planar portion 20. For example, the height of the tapered side portion 24 decreases or tapers from a center 30 of the tapered side portion 24 on the feed side shown in FIG. 1 (where the tapered side portion 24 has its greatest length) to a location at or near a center 60 of the tapered side portion 24 on the back side shown in FIG. 2A (where the tapered side portion 24 has its shortest length).

Figure 2C:
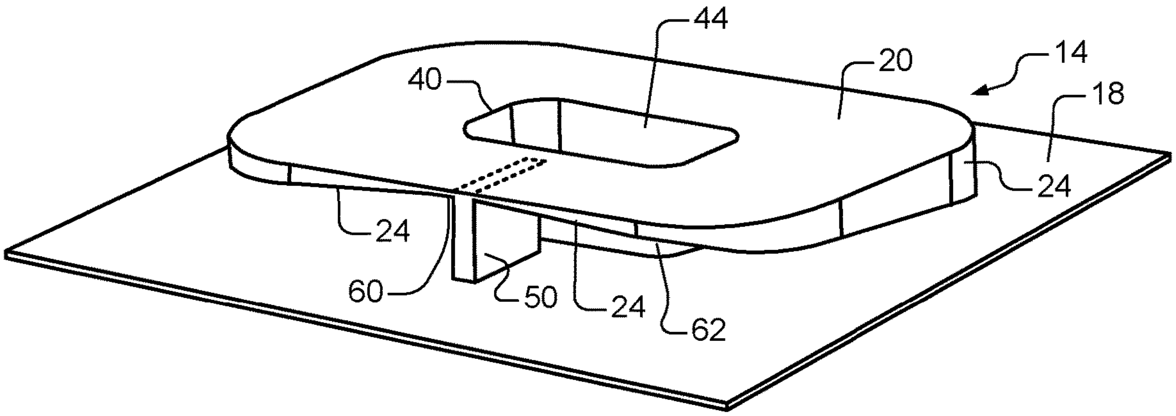

In some examples, the height of the tapered side portion 24 tapers fully at the center 60 as shown in FIG. 2A. In other examples, the tapered side portion 24 does not taper fully at the center as shown in FIG. 2C. Alternately, the tapered side portion 24 tapers from a center 30 on the feed side shown in FIG. 1 and ends prior to reaching the center 60 as shown in FIG. 2B. In some examples, the height of the tapered side portion 24 monotonically decreases.

The antenna body 14 is mounted to the ground plane 18 and a gap 28 is defined between the center 30 of the tapered side portion 24 on the feed side and the ground plane 18. In some examples, an antenna feed 46 extends through an opening 48 formed in the ground plane 18 and is connected to the antenna body 14 at the center 30 of the feed side. For example only, the antenna feed 46 can include an inner conductor of a coaxial cable and a woven copper shield (not shown) of the coaxial cable can be connected to the ground plane 18. While a specific type of antenna feed is shown for illustration purposes, the antenna can be fed using other antenna feed arrangements. For example, rather than passing perpendicular through the ground plane, the antenna feed can be arranged and connected to the antenna body at the feed location parallel to and above the ground plane (and not pass through the ground plane).

In FIG. 1B, the tapered side portion 24 can optionally taper downwardly adjacent to the feed location and then transition to a non-tapered section 31 at the antenna feed location. In some examples, a transition between the tapered side portion 24 and the non-tapered section 31 can be rounded. In some examples, a lower edge of the non-tapered section 31 is arranged parallel to the ground plane. In some examples, the non-tapered section 31 has a horizontal width in range from 0.5 mm to 20 mm, although other widths may be used. The horizontal width of the non-tapered section 31 and the height of the gap 28 can be varied to influence the impedance of the UWB antenna at the antenna feed point.

The planar portion 20 lies in a plane that is generally parallel to and spaced above the ground plane 18. A connecting portion 50 is located on a back side of the antenna body 14 to connect the planar portion 20 and/or the tapered side portion 24 to the ground plane 18. In some examples, the connecting portion 50 includes a conducting portion that connects the planar portion 20 to the ground plane 18 but does not extend to the cylinder 44 (FIG. 2A). In other examples, the connecting portion 50 includes a conducting wall portion having a generally rectangular cross-section (in a radial direction of the planar portion 20). If the conducting wall is used, the connecting portion 50 is attached to a lower surface of the planar portion 20 near the center 60 of the planar portion 20 and extends fully (in FIG. 2B) or partially (FIG. 2C) to an outer surface 62 of the cylinder 44.

The antenna body 14 can be made entirely of conducting material such as metal. Alternately, one or more portions of the antenna body 14 can include a supporting surface that is made of a non-conducting material and a layer made of a conducting material attached to, deposited on or printed on the non-conducting material.

Without committing to any theory, the UWB antenna 10 operates like a cavity-backed slotted antenna with opposite ends and the cavity wrapped around and connected together.

Most antenna designs require the height of the UWB antenna to be at least approximately 4 of the wavelength corresponding to the lowest desired operating frequency of the UWB antenna 10. In some examples, the UWB antenna 10 according to the present disclosure can be designed with a vertical height that is as low as approximately 1/20th of a wavelength corresponding to the lowest desired operating frequency. As used herein, approximately 1/20th of a wavelength refers to 4% to 6% of the wavelength corresponding to the lowest desired operating frequency. When height is less of a concern, the UWB antenna 10 can be designed with other vertical heights such as 1/10th of a wavelength corresponding to the lowest desired operating frequency (or other heights).

For example, the UWB antenna can be designed for 1.7 GHz applications and can have a height of approximately 8-9 mm. In some examples, the width W and length L of the UWB antenna is in a range from 0.5 to 5 times the height H of the UWB antenna. In some examples, the ground plane is wider than the L and W of the antenna body by first and second predetermined distances, respectively. The first and second predetermined distances are the same (symmetric) or different (asymmetric).

The UWB antenna 10 has an extremely low profile. As can be appreciated, the relatively low height of the UWB antenna (e.g. approximately 1/20λ) provides a significant advantage when attempting to locate the UWB antenna in unobtrusive locations to enhance the design of the vehicle. The increased height of conventional antennas makes it more difficult to locate in or on a vehicle without adversely impacting the design of the vehicle or reducing headroom when located between the headliner and roof.

For example only, the UWB antenna 10 may be designed for 617 MHz applications and can handle a first frequency band from 617 MHz to 960 MHz, a second frequency band from 1.7 GHz to 2.7 GHz and a third frequency band from 3.3 GHz to 6 GHz, although other frequencies ranges may be used.

Figure 3:
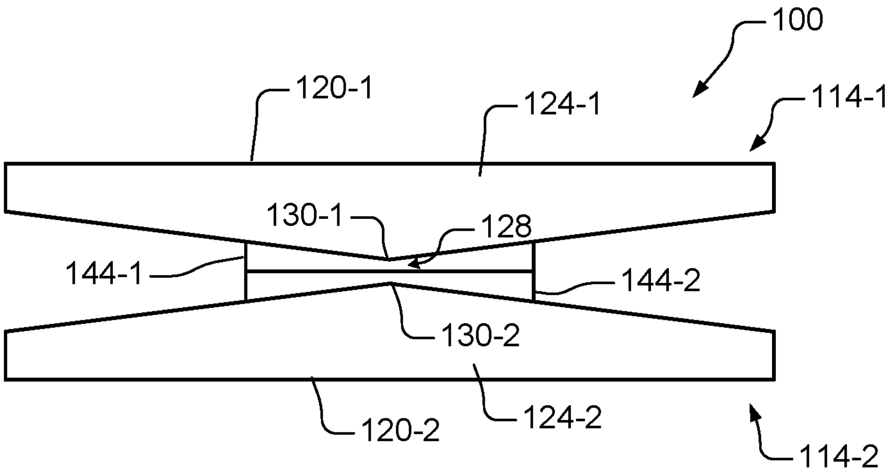
FIG. 3 is a side view of a feed side of another example of an ultra wide band (UWB) antenna including a first antenna body and a second antenna body arranged mirrored relative to the first antenna body, connected together and driven by the same antenna feed according to the present disclosure.
Figure 4:
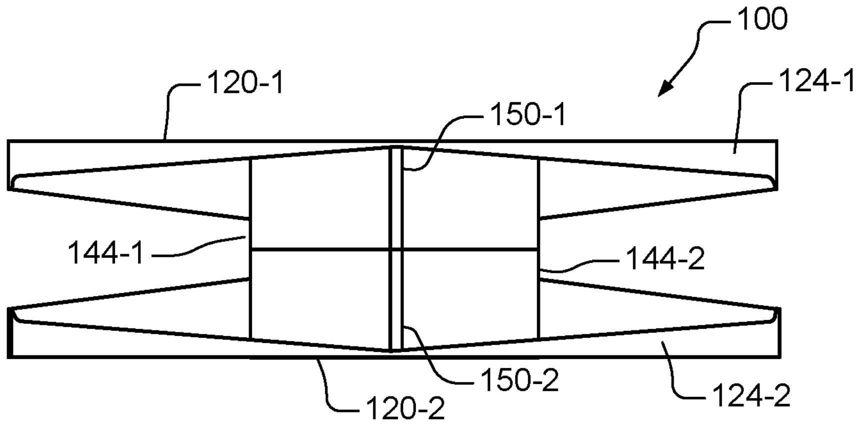
FIG. 4 is a side view of a back side of the UWB antenna of FIG. 3.

In the UWB antenna 10 shown in FIGS. 1A to 2C, the UWB antenna 10 is arranged above the ground plane 18. In this design, the ground plane 18 acts as a mirror. A similar effect can be achieved by adding a second antenna body that is mirrored relative to a plane formerly including the ground plane and connected to the same antenna feed as shown in FIGS. 3 and 4. The mirrored effect is similar to the mirroring of a monopole antenna above a ground plane to obtain a dipole antenna in free space without a ground plane.

In FIGS. 3 and 4, another example of an UWB antenna 100 is shown. The UWB antenna 100 includes first and second antenna bodies 114-1 and 114-2. The second antenna body 114-2 is mirrored relative to the ground plane, arranged adjacent to and connected to the first antenna body 114-1. The first and second antenna bodies 114-1 and 114-2 include planar portions 120-1 and 120-2 and tapered side portions 124-1 and 124-2, respectively, as described above. A gap 128 is defined between centers 130-1 and 130-2 of the tapered side portion 124-1 and the tapered side portion 124-2, respectively. An antenna feed (not shown) is connected to the first and second antenna bodies 114-1 and 114-2 at centers 130-1 and 130-2, respectively.

The planar portions 120-1 and 120-2 are arranged in planes that are spaced apart and generally parallel to one another. Cylinders 144-1 and 144-2 extend towards one another and include edges that are connected together. Connecting portions 150-1 and 150-2 extend towards one another and are connected together. Alternately, a single connecting portion can be used. As can be appreciated, a similar mirrored arrangement can be used for any of the UWB antennas described herein.

The length, width and height of the UWB antennas described herein can be adjusted to achieve different design criteria such as frequency, bandwidth and/or radiation profile of the UWB antennas.

Figure 5A:
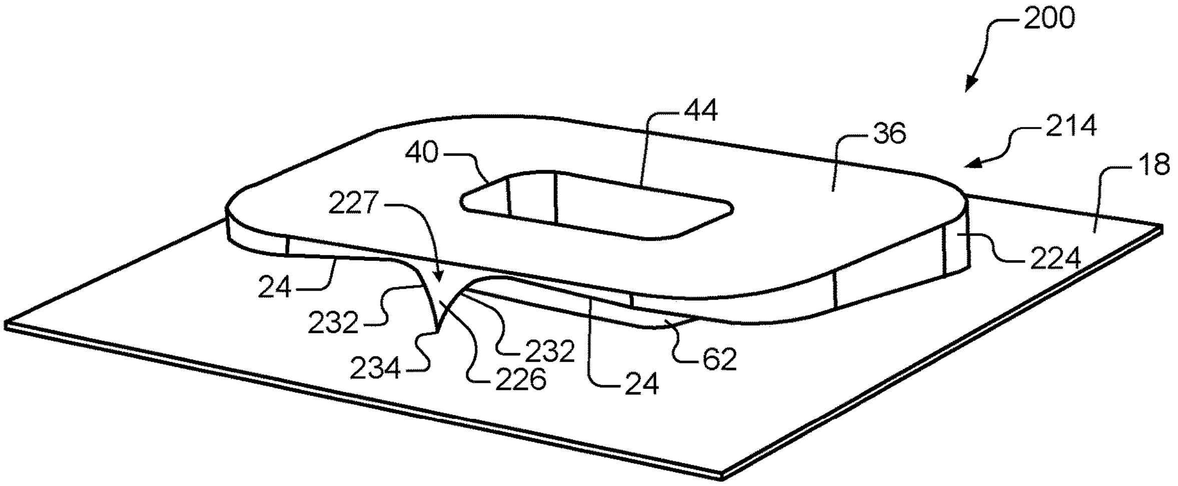
FIGS. 5A and 5B are perspective views of a back side of other examples of an ultra wide band (UWB) antenna arranged above a ground plane according to the present disclosure.
Figure 5B:
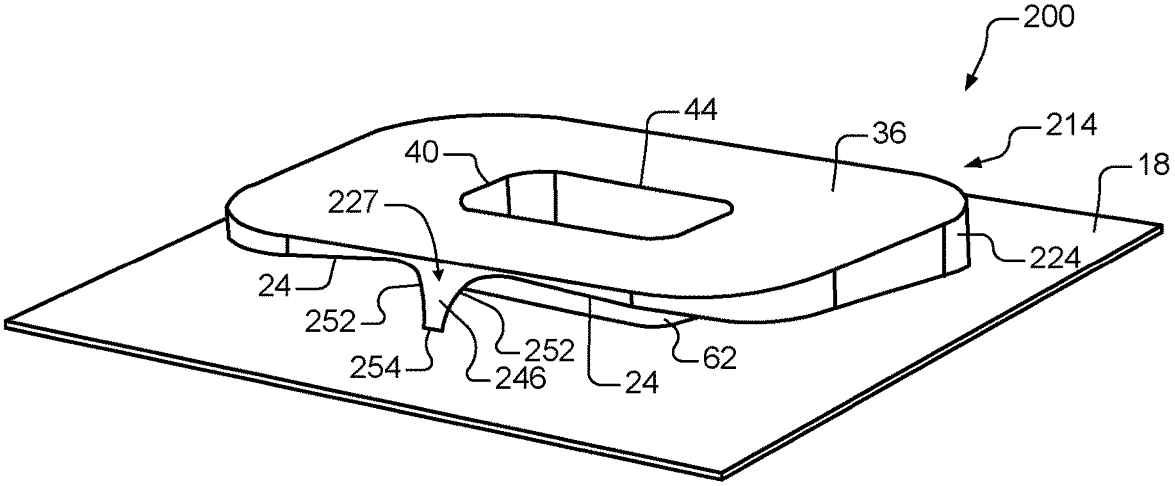

Referring now to FIGS. 5A and 5B, an UWB antenna 200 is shown to include an antenna body 214 arranged above a ground plane. In this example, the connecting portion (e.g. connecting portion 50 in FIGS. 1, 2A, 2B and 2C) may be used or omitted. A tapered side portion 224 generally tapers from the feed side to the back side as shown and described above. However, a center portion 227 at the back side of the tapered side portion 224 includes a grounded portion 226 extending downwardly (instead of or in addition to the connecting portion shown in FIGS. 1, 2A and 2B). The grounded portion 226 includes sloped sides 232 that extend downwardly and meet at a distal end 234 of the grounded portion 226 and connect to the ground plane 218. In some examples, the sides 232 have curved or straight profiles and/or the distal end 234 is pointed, although other shapes can be used.

In FIG. 5B, the shape of the grounded portion can be varied. The center portion 227 at the back side of the tapered side portion 224 includes a grounded portion 246 extending downwardly (instead of or in addition to the connecting portion shown in FIGS. 1, 2A and 2B). The grounded portion 246 includes sloped sides 232 that extend downwardly and meet at a distal end 254 of the grounded portion 226 and connect to the ground plane 218. In some examples, the sides 232 have curved or straight profiles and/or the distal end 234 includes a portion that is parallel to the ground plane 218.

Figure 6:
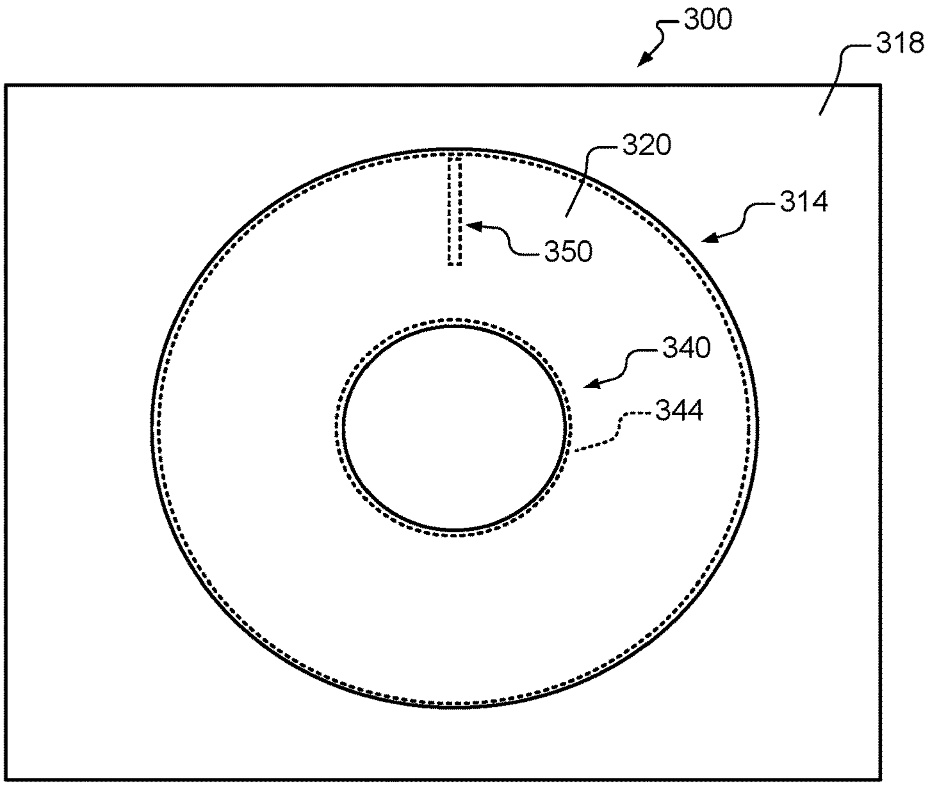
FIG. 6 is a plan view of a top side of another example of an ultra wide band (UWB) antenna arranged above a ground plane according to the present disclosure.

Referring now to FIG. 6, the shape of the antenna body can be varied depending upon a particular application. For example, an UWB antenna 300 in FIG. 6 includes a planar portion 320 having a circular or elliptical cross-section. In some examples, an opening 340 (if used) formed in the planar portion 320 also has the same shape as the planar portion 320, although other shapes can be used. Likewise, in some examples, a cylinder 344 is connected to the planar portion 320 at an edge of the cavity 340 has the same shape as the planar portion 320, although other shapes can be used.

Figure 7:
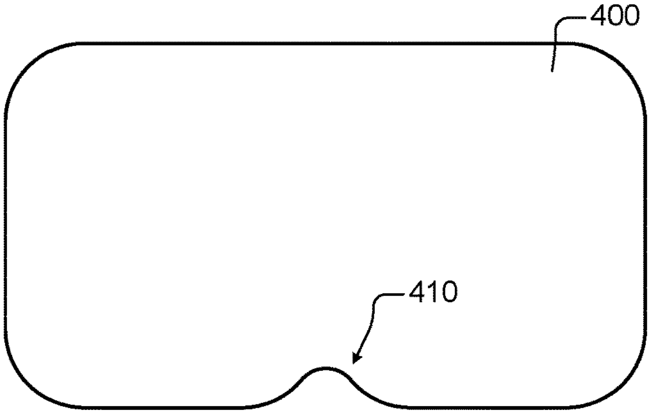
FIGS. 7 and 8 are plan views illustrating planar portions with notches according to the present disclosure.
Figure 8:
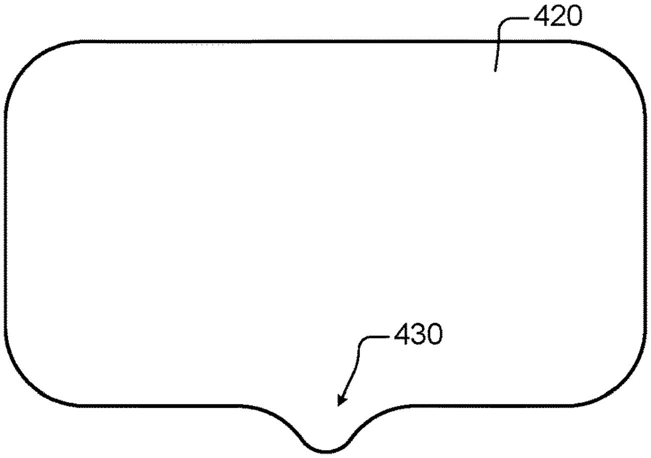

Referring now to FIGS. 7 and 8, the shape of the planar portion can be varied. In FIG. 7, a planar portion 400 can include a notch 410 located at a center of the back side of the antenna body. The tapered side portion (not shown in FIG. 7) can follow an edge of the planar portion 400 inwardly around the notch or terminate prior to reaching a point where the notch 410 is located.

In FIG. 8, a planar portion 420 can include a projection 430 located at a center of the back side of the antenna body. The tapered side portion (not shown) can follow an edge of the planar portion 400 outwardly around the projection 430, not follow the projection 430 (and remain straight near the center of the back side) or terminate prior to the projection 430. The planar portion 420 may extend further outwardly as compared to the tapered side portion. In other words, the tapered side portion may be located and connected inside of an outer edge of the planar portion 420.

In other features, the UWB antenna has an approximate bandwidth ratio of $F_{high}/F_{low}$=1:10, with $F_{high}$ being the highest frequency that the UWB antenna is matched to and $F_{low}$ being the lowest frequency the UWB antenna is matched to.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. An ultra wide band antenna, comprising:
- a first antenna body including:
  - a first planar portion;
  - a first tapered side portion extending perpendicular to the first planar portion, wrapping around at least 50% of an outer edge of the first planar portion and tapering in height from a feed side of the first antenna body in a direction towards a back side of the first antenna body; and
  - a first cylinder connected to a bottom surface of the first planar portion; and
- a second antenna body including:
  - a second planar portion;
  - a second tapered side portion extending perpendicular to the second planar portion, wrapping around at least 50% of an outer edge of the second planar portion and tapering in height from a feed side of the second antenna body in a direction towards a back side of the second antenna body; and
  - a second cylinder connected to a bottom surface of the second planar portion, wherein the second antenna body is arranged in a mirrored position adjacent to the first antenna body and wherein edges of the first cylinder and the second cylinder are connected together, and
- a connecting portion connecting at least one of the first planar portion and the first tapered side portion on the back side of the first antenna body to at least one of the second planar portion and the second tapered side portion on the back side of the second antenna body.

2. The ultra wide band antenna of claim 1, wherein the first planar portion includes an opening and wherein the first cylinder is connected along an edge of the opening.

3. The ultra wide band antenna of claim 1, wherein a height of the first antenna body is equal to approximately 1/20 of a wavelength corresponding to a lowest desired operating frequency.

4. The ultra wide band antenna of claim 1, wherein:
- the feed side of the first tapered side portion has a first height and the feed side of the second tapered side portion has the first height,
- the feed side of the first tapered side portion is spaced from the feed side of the second tapered side portion by a predetermined gap, the back side of the first tapered side portion has a second height that is less than the first height of the first tapered side portion, and the back side of the second tapered side portion has a second height that is less than the first height of the second tapered side portion.

5. The ultra wide band antenna of claim 1, wherein the first planar portion and the second planar portion have a cross-section selected from a group consisting of a rounded rectangular shape, a circular shape and an elliptical shape.

6. The ultra wide band antenna of claim 1, wherein an antenna feed is connected to an edge of the first tapered side portion on the feed side of the first antenna body and to an edge of the second tapered side portion on the feed side of the second antenna body.

7. The ultra wide band antenna of claim 2, wherein a width and a length of first planar portion is equal to 0.5 to 5 times a height of the first antenna body.

8. The ultra wide band antenna of claim 1, wherein the connecting portion extends vertically from the bottom surface of the first planar portion to the bottom surface of the second planar portion and horizontally from the outer edges of the first planar portion and the second planar portion at least partially to outer surfaces of the first cylinder and the second cylinder.

9. The ultra wide band antenna of claim 1, wherein a portion of the first tapered side portion at a center of the back side of the first antenna body extends downwardly and is connected to a portion of the second tapered side portion at a center of the back side of the second antenna body.

10. The ultra wide band antenna of claim 1, wherein the first tapered side portion wraps around greater than 90% of the first planar portion.

* * * * *